United States Patent Office 3,153,217
Patented Oct. 13, 1964

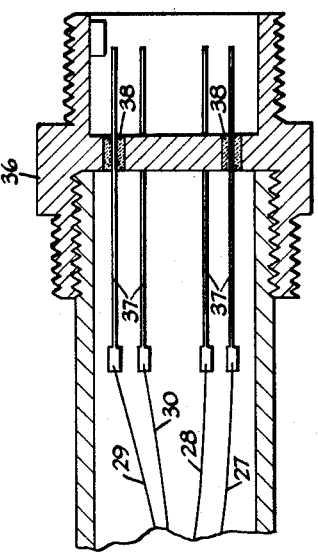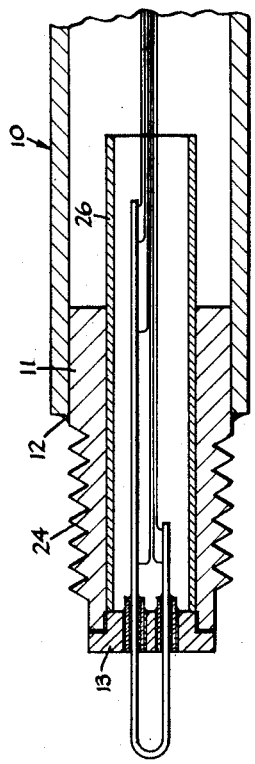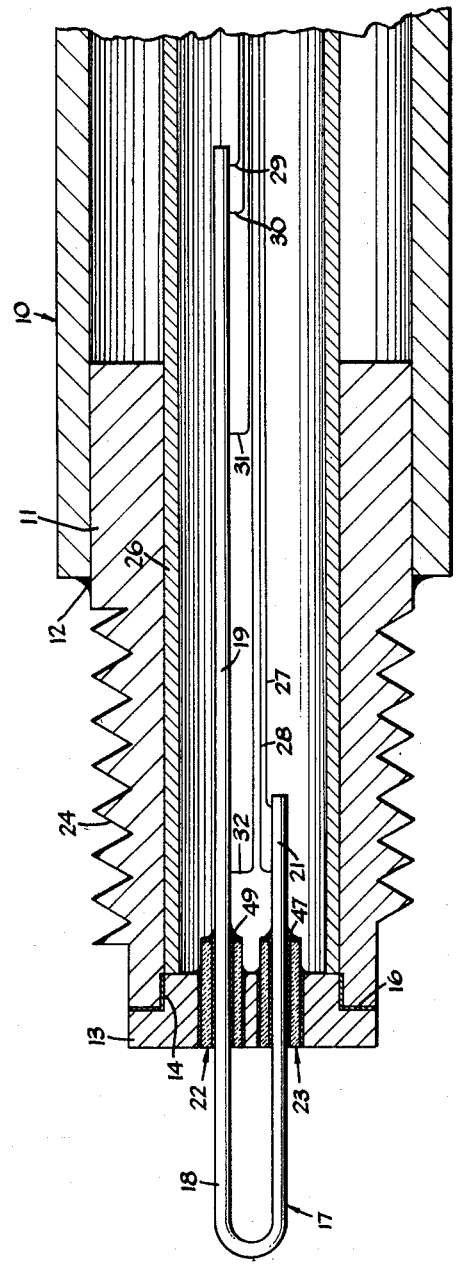

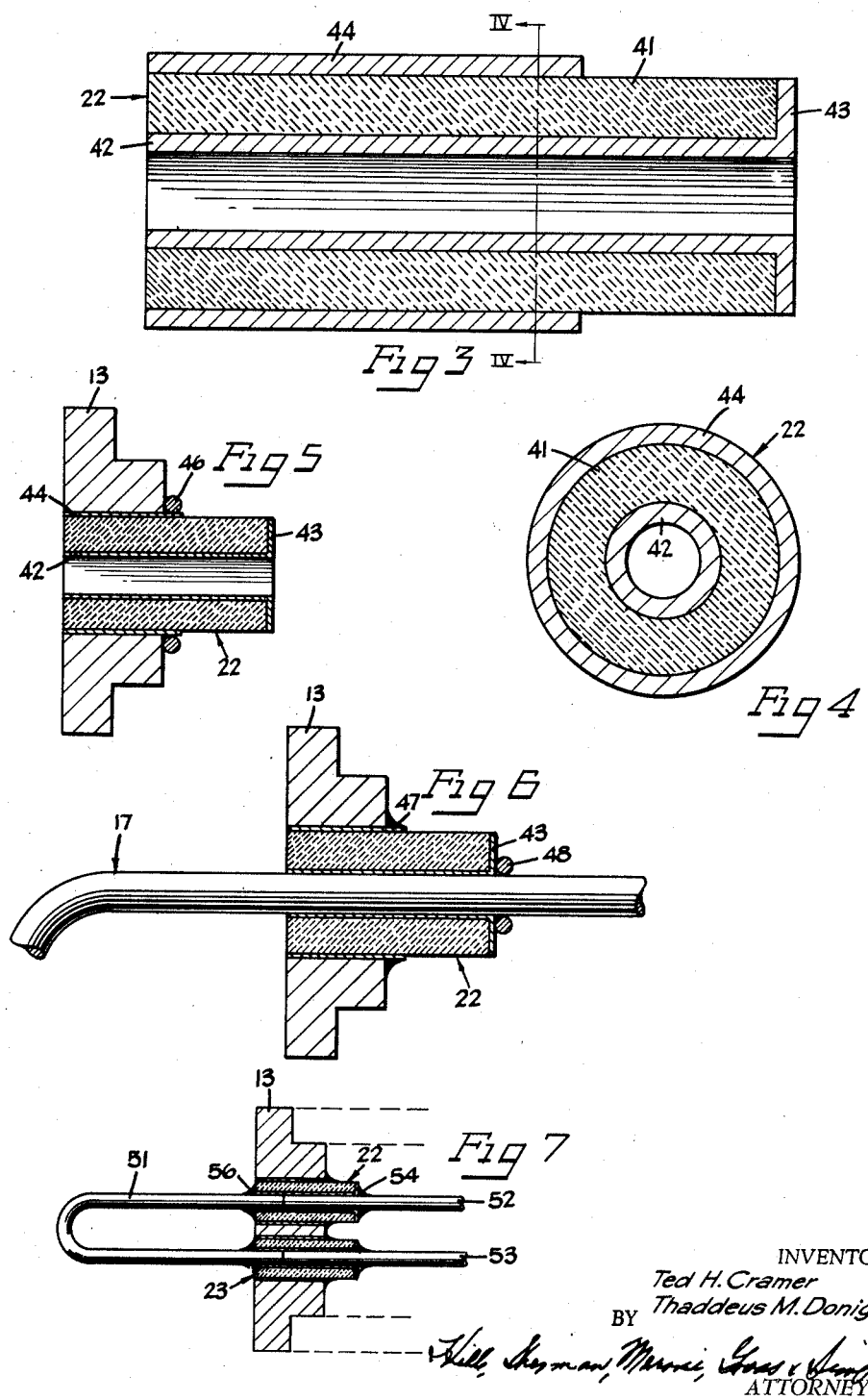

3,153,217
ELECTRICAL CORROSION PROBE
Ted H. Cramer, Garden Grove, and Thaddeus M. Donigiuan, Anaheim, Calif., assignors to Magna Corporation, Santa Fe Springs, Calif., a corporation of California
Filed Dec. 3, 1962, Ser. No. 241,739
7 Claims. (Cl. 338—13)

The present invention relates to a corrosion measuring probe for determining corrosion by the electrical resistance method.

Probably the most accurate method for monitoring the progress of corrosion continuously is the method which makes use of a corrodible metal specimen in the environment whose corrosive tendencies are to be monitored, and involves the determination of changes of electrical resistance of the specimen as corrosion proceeds. In this type of system, the corroding element is normally made part of an electrical bridge circuit of the Wheatstone or Kelvin type. Since electrical resistance also changes due to tempearture changes, it is necessary, to secure an accurate reading, to compensate for these temperature changes. To do this, there is provided a compensating element having the same temperature-resistance characteristics as the corroding element, and located in the same environment as the corroding element, but being protected against corrosion, usually by means of a protective coating. This element, called the reference element, comprises another arm of the bridge circuit in which the corroding element is located. Since temperature changes affect both the corroding element and the resistance element equally, the ratio of the resistances of the two elements, determined by the bridge circuit, is then an accurate measure of the progress of corrosion in the system.

A typical design for corrosion measuring probes used in the past involved the use of a replaceable corroding specimen consisting essentially of a wire loop cast into a supporting tube. The assembly of these inserts has been accomplished by running electrical leads through the insert body tube and then filling the void space between the tube and the leads with some type of potting compound. For temperatures below about 400° F., epoxy resins have been extensively used. For temperatures above 500° F., ceramic-like materials such as Saureisen cement have been used to fill the void space. Many different materials have been tested for this application, and all have been found to have disadvantages under some conditions. For example, although epoxy resins are generally resistant to chemical attack at low to moderate temperatures, they are more and more rapidly attacked by many chemicals as the temperature of exposure is increased. Most ceramic-like potting compounds, on the other hand, are resistant to acid solutions but are rapidly attacked by alkaline solutions. Furthermore, the porosity of this type of potting compound permits the body of the probe to become saturated with fluids in a short period of time.

The problems of permeation arise because a small portion of the potting compound must be left exposed to the environment at the base of the measuring element loop. The rate of attack by chemical agents at the exposed end of the potting compound has been reduced substantially by the use of a material such as polytetrafluoroethylene buttons which fit tightly around the measuring elements and inside the end of the insert body tubes. However, although the button acts as a diffusion barrier and slows down direct chemical attack, it does not prevent the migration of fluids in and out of the end of the tube due to changes in pressure and temperature. As a result, the electrical circuitry inside the insert body is often damaged by chemical attack.

More recently, there has been developed a corrosion measuring probe in which the measuring element is hermetically sealed to the end cap of the probe by means of metal-to-glass seals. While this probe represents an improvement over probes of the past, yet it has its own limitations. For one, the glass employed might soften at a temperature below that at which it is desired to operate the corrosion measuring device. In addition, the pressure rating of glass-to-metal seals decreases as the temperature increases whereas in the environment in which the probes are located, the pressure of the systems usually increases with increasing temperature. Furthermore, the hermetically sealed probe is limited in its application since glass-to-metal seals cannot be made to many alloys that are useful in corrosion work. For example, copper bearing alloys such as brasses, bronzes, and the like cannot be sealed to glass successfully. Furthermore, glass-to-metal seals cannot be made to alloys having coefficients of thermal expansion significantly different from available glasses.

With the foregoing in mind, an object of the present invention is to provide a probe assembly which may be used at temperatures and pressures greater than those at which existing probes can operate, even including those probes which have hermetic seals.

Another object of the present invention is to provide a probe which may employ measuring elements composed of alloys which could not heretofore be used in probes requiring glass-to-metal seals.

Still another object of the invention is to provide a probe in which the exposed portion of the measuring element may be renewed in a minimum of time, with a minimum of expense and expenditure of materials, thus reducing the overall expense to the user.

A further description of the present invention will be made in conjunction with the attached sheets of drawings which illustrate several embodiments of the improved corrosion measuring probe of the present invention.

In the drawings:

FIGURE 1 is a cross-sectional view of an assembled probe employing the principles of the present invention;

FIGURE 2 is a fragmentary cross-sectional view of the forward end of the probe of FIGURE 1 drawn to a larger scale;

FIGURE 3 is a cross-sectional view of one of the ferrules employed in the probes of FIGURES 1 and 2, with certain dimensions exaggerated for purposes of clarity;

FIGURE 4 is a cross-sectional view taken substantially along the line IV—IV of FIGURE 3;

FIGURE 5 is a cross-sectional view of the end cap and ferrule assembly at a preliminary stage in the assembly of the device;

FIGURE 6 is a view similar to FIGURE 5 but illustrating a succeeding portion of the method of assembly during which the measuring element is bonded to the ferrule; and FIGURE 7 is a fragmentary view of a modified form of the invention on a scale substantially less than the scale of FIGURES 5 and 6.

As shown in the drawings:

In FIGURE 1, reference numeral 10 indicates generally an outer support tube composed of a corrosion resistant material such as stainless steel or the like. Received within the tube 10 is a sleeve 11 which is secured to the tube 10 by means of brazing represented at a brazing fillet 12 at the extreme forward end of the support tube 10.

One end of the sleeve 11 is closed off by means of an end cap 13 having a reduced diameter annular flange portion 14 received along the inner diameter of the sleeve 11. Both the sleeve 11 and the end cap 13 are suitably composed of corrosion resistant material such as stainless steel, nickel alloys, or the like. A deposit of brazing material 16 secures the end cap 13 to the sleeve 11.

In the form of the invention illustrated in FIGURES 1 and 2, the measuring element takes the form of a corrodible metal tube or wire 17 having a loop portion 18 extending beyond the end cap 13, and having a relatively long leg portion 19 and a shorter leg portion 21 extending within the confines of the sleeve 11. The measuring element 17 is secured to the end cap by having its leg portions bonded to a pair of ferrules 22 and 23 which, in turn, are bonded to the end cap 13. A further description of the method of assembly and bonding will be made in a succeeding portion of this specification.

The forward end of the sleeve 11 may be provided with a threaded portion 24 for receiving a protective shield (not shown) which fits over the exposed portion of the measuring element 17.

A potting tube 26 is snugly received within the sleeve 11 and extends beyond the length of the leg 19 to serve as a receptacle for a potting compound which is poured about the legs 19 and 21, and the conductors associated therewith as a final step in the assembly of the components.

The leg portions 19 and 21 of the measuring element 17 are provided with six electrical conductors, as shown best in FIGURE 2. Conductors 27 and 28, secured to the shorter leg portion 21 are used to provide current and potential taps for a Kelvin bridge circuit. Conductors 29, 30, and 31 provide similar taps for the leg portion 19.

The leg portion 19 is made longer than the leg portion 21 so that it provides a reference element whose ratio of resistance to the resistance of the exposed portion of the loop remains constant despite changes in temperature. A center tapping lead 32 is secured to the leg 19 to define the electrical mid point (or a predetermined resistance ratio) between the resistances of the reference element located within the sleeve 11, and the corroding element which extends into the corrosive environment.

At the rear end of the support 10, there is provided a threaded end cap 36 which engages a threaded end portion on the support tube 10. Prong connectors 37 are electrically connected to the leads extending from the reference and measuring elements, through the end cap 36 by means of hermetic seals 38. As illustrated in FIGURE 1, the prongs 37 extend beyond the seals 38 for engagement with a suitable electrical connector (not shown) which supplies current to the reference element and the corroding element from the bridge circuit.

The ferrules 22 and 23 are illustrated more particularly in FIGURES 3 to 5. The ferrule consists of a hollow cylindrical body 41 consisting of a fused ceramic material such as alumina. The inner diameter of the body 41 is provided with a metallic coating 42 extending the full length of the inner diameter and being integral with a coating 43 on one end face of the hollow cylinder. The thickness of the metallic coatings illustrated in FIGURES 3 and 4 has been exaggerated for purposes of clarity. The outer diameter of the hollow cylinder is provided with a coating of metal 44 which extends less than the full length along the outer diameter, so that there is not electrical continuity between the coating 44 and the coating 42.

As illustrated best in FIGURE 5, the ferrule 22 is inserted through a suitable aperture formed in the end cap 13 with a reasonably snug fit. Then, a brazing ring 46 composed of a high temperature brazing material melting at about 1800° F. is applied about the ferrule 22 and heated to the brazing temperature, whereupon the ring 46 melts and flows between the mating surfaces of the end cap 13 and the outer coating 44. The liquid brazing material thereby forms a metal to metal bond between the ferrule 22 and the end cap 13, resulting in the production of a brazing fillet 47 between the two members.

The next step consists in inserting the measuring element 17 through the fillet 22, as illustrated in FIGURE 6 and applying another brazing ring 48 about the sensing element 17 and against the coating 43 on the end face of the ferrule 22. After being subjected to an appropriate brazing temperature, the metal of the ring 48 melts and flows into the junction, leaving a brazing fillet 49 (FIGURE 2) along the bonded area. Then, the electrical leads are applied to the leg portions of the sensing element 17 by soldering or the like.

The succeeding steps consist in brazing the end cap subassembly to the sleeve 11, to provide the brazing joint 16 therebetween. The potting tube 26 is then filled with a high temperature potting compound such as "Sauereisen" cement. After the potting compound has set, the sleeve 11 is placed in the outer support tube 10, in which it makes a slip fit. The sleeve 11 is then brazed to the outer support tube 10 along the brazed joint 12.

When it is desired to replace the sensing element 17, heat is applied either to the joint 12 or to the joint 16 to cause melting of the brazing material. If the sleeve 11 has become badly corroded or mechanically damaged, it can also be renewed at the same time as the sensing element and the end cap.

For sensing elements which are composed of quite corrosive materials such as mild steel, the modified form of the invention shown in FIGURE 7 is preferred. In this arrangement, the sensing element is made in three pieces, a loop portion 51 which terminates within the ferrules 22 and 23, and which has abutting conductors 52 and 53 constituting the legs of the sensing element. The conductors 52 and 53, of course, are composed of the same material as the loop portion 51.

In assembling the structure of FIGURE 7, the ferrules 22 and 23 are first brazed into the close fitting holes in the cap 13, using a braze melting above about 1800° F. The conductors 52 and 53 are then inserted part way into the ferrules 22 and 23, and brazed into place with a brazing material melting at about 1800° F. to produce a brazed joint 54. The loop portion 51 is then inserted within the ferrules 22 and 23 and brazed as indicated at reference numeral 56 with a material which melts at about 1200° F. By means of controlled heating, this brazing joint can be made without melting the 1800° F. braze employed at joint 54. For this purpose, induction heating is the preferred method of supplying controlled heat.

With the structure of FIGURE 7, the loop 51 may be replaced by placing the tip of the probe into a source of heat maintained at a temperature of about 1200 to 1400° F., pulling out the old loop, and placing a new loop in its place. An additional brazing joint 56 can be applied if necessary. This replacement can be repeated as often as required until the condition of the end cap 13 becomes such that it also must be replaced. Then, the entire unit may be replaced as described in conjunction with the form of the invention illustrated in FIGURES 1 to 6.

It will be evident that various modifications can be made to the described embodiments without departing from the scope of the present invention.

We claim as our invention:

1. A corrosion measuring probe comprising a sleeve, an end cap closing off one end of said sleeve and brazed to said sleeve, a corrodible metal element having a loop portion extending beyond said end cap, and a pair of ferrules secured to said end cap and receiving the legs of said element, each of said ferrules comprising a refractory ceramic hollow cylinder whose inner and outer surfaces have metallic coatings thereon providing metal to metal bonds with said legs and said end cap, respectively.

2. A corrosion measuring probe comprising an outer support tube, a sleeve received within said support tube, an end cap closing off one end of said sleeve and brazed to said sleeve, a corrodible metal element having a loop portion extending beyond said end cap and leg portions extending within said sleeve, and a pair of ferrules secured to said end cap and receiving the leg portions of said element, each of said ferrules having a refractory ceramic hollow cylinder whose inner and outer surfaces have metallic coatings thereon providing metal to metal bonds with said leg portions and said end cap, respectively.

3. A corrosion measuring probe comprising an outer support tube, a sleeve received within said support tube, an end cap closing off one end of said sleeve and brazed to said sleeve, a corrodible metal element having a loop portion extending beyond said end cap and parallel leg portions extending within the confines of said sleeve, a pair of ferrules secured to said end cap and receiving the leg portions of said element, each of said ferrules comprising a refractory ceramic hollow cylinder whose inner and outer surfaces have metallic coatings thereon providing metal to metal bonds with said leg portions and said end cap, respectively, a potting tube within said sleeve and extending beyond the ends of said leg portions, and a refractory potting material in said potting tube enveloping said leg portions.

4. A corrosion measuring probe comprising an outer support tube, a sleeve received within said support tube, an end cap closing off one end of said sleeve and brazed to said sleeve, a corrodible metal element having a loop portion extending beyond said end cap and leg portions extending within said sleeve, and a pair of ferrules secured to said end cap and receiving said leg portions, each of said ferrules comprising a refractory ceramic hollow cylinder whose inner and outer surfaces have metallic coatings thereon, and deposits of a brazing material bonded to said coatings to thereby bond together said ferrules to said leg portions and said end cap.

5. The probe of claim 3 in which the coatings on said ferrules extend the full length of the cylinder along the inner diameter but terminates short of the full length of the cylinder on the outer diameter thereof.

6. A corrosion measuring probe comprising an outer support tube, a sleeve received within said support tube and brazed thereto, an end cap closing off one end of said sleeve and brazed thereto, a corrodible metal element having a loop portion extending beyond said end cap and parallel leg portions extending within the confines of said sleeve, a pair of ferrules extending into said end cap, each of said ferrules comprising a refractory ceramic hollow cylinder whose inner and outer surfaces have metallic coatings thereon, said ferrules being joined to both said end cap and to said leg portions by brazing material bonded to said coatings on said inner and outer surfaces of said ferrules.

7. A corrosion measuring probe comprising a sleeve, an end cap closing off one end of said sleeve, a corrodible metal element comprising a loop portion extending beyond said end cap, a pair of hollow cylindrical ferrules secured to said end cap, said corrodible metal element having leg portions terminating within said ferrules, and a conductor abutting each of said leg portions within said ferrules and extending into said sleeve, said ferrules being brazed to said end cap and to said leg portions.

References Cited in the file of this patent
UNITED STATES PATENTS
2,993,366    Birkness _____ July 25, 1961